(12) United States Patent
Kammerer et al.

(10) Patent No.: US 10,106,258 B2
(45) Date of Patent: Oct. 23, 2018

(54) OVERHEAD LUGGAGE COMPARTMENT FOR AIRPLANES, AND AIRPLANE

(71) Applicant: FACC AG, Ried im Innkreis (AT)

(72) Inventors: Bernhard Kammerer, Zell am Pram (AT); Jakob Schoerkhuber, Geboltskirchen (AT)

(73) Assignee: FACC AG, Ried im Innkreis (DE)

( * ) Notice: Subject to any disclaimer, the term of this patent is extended or adjusted under 35 U.S.C. 154(b) by 158 days.

(21) Appl. No.: 15/313,060

(22) PCT Filed: May 26, 2015

(86) PCT No.: PCT/AT2015/050131
§ 371 (c)(1),
(2) Date: Nov. 21, 2016

(87) PCT Pub. No.: WO2015/179889
PCT Pub. Date: Dec. 3, 2015

(65) Prior Publication Data
US 2017/0137130 A1    May 18, 2017

(30) Foreign Application Priority Data

May 26, 2014    (AT) .............................. A 50373/2014

(51) Int. Cl.
*B64D 11/00*    (2006.01)
(52) U.S. Cl.
CPC .................. *B64D 11/003* (2013.01)
(58) Field of Classification Search
CPC ................................... B64D 11/003
See application file for complete search history.

(56) References Cited

U.S. PATENT DOCUMENTS 4,368,937 A * 1/1983 Palombo ............. B64D 11/003
                                                    296/37.7
5,244,269 A * 9/1993 Harriehausen ......... B60R 5/003
                                                    244/118.5
(Continued)

FOREIGN PATENT DOCUMENTS

AT        410536 B     5/2003
AT        413812 B     6/2006
(Continued)

OTHER PUBLICATIONS

ISA European Patent Office, International Search Report Issued in Application No. PCT/AT2015/050131, dated Aug. 31, 2015, WIPO, 6 pages.

(Continued)

*Primary Examiner* — Christopher P Ellis
(74) *Attorney, Agent, or Firm* — McCoy Russell LLP

(57) ABSTRACT

An overhead luggage compartment for airplanes, comprising a stationary luggage compartment element which can be secured to a structural element and comprising a movable luggage compartment element which can be loaded with a piece of luggage, said compartments being connected together by a joint such that the movable luggage compartment element can be pivoted between an open position and a closed position. The overhead luggage compartment may comprise a device for holding the movable luggage compartment element in the open position, said device having a force transmission element which is connected to the joint between the stationary luggage compartment element and the movable luggage compartment element.

15 Claims, 7 Drawing Sheets

(56) References Cited

U.S. PATENT DOCUMENTS

| | | | | |
|---|---|---|---|---|
| 5,839,694 A * | 11/1998 | Bargull | ............... | B64D 11/003 244/118.1 |
| 5,934,615 A * | 8/1999 | Treichler | ............ | B64D 11/003 244/118.5 |
| 2004/0245897 A1 | 12/2004 | Stephan et al. | | |
| 2008/0112754 A1 | 5/2008 | Schmitz et al. | | |
| 2010/0206985 A1 * | 8/2010 | Rahlff | ................. | B64D 11/003 244/118.5 |
| 2011/0186681 A1 | 8/2011 | Vine et al. | | |
| 2012/0038254 A1 | 2/2012 | Rafler | | |
| 2012/0273615 A1 * | 11/2012 | Rafler | ................ | B64D 11/003 244/118.5 |
| 2013/0119200 A1 * | 5/2013 | Graf | .................... | B64D 11/003 244/118.5 |
| 2013/0257246 A1 * | 10/2013 | Graf | .................... | B64D 11/003 312/319.2 |
| 2014/0246968 A1 * | 9/2014 | Geng | ................. | B64D 11/003 312/319.2 |
| 2015/0090838 A1 * | 4/2015 | Schmitz | .............. | B64D 11/003 244/118.5 |
| 2015/0360780 A1 | 12/2015 | Kammerer et al. | | |
| 2016/0075433 A1 * | 3/2016 | Eakins | ................ | B64D 11/003 701/49 |
| 2016/0229537 A1 * | 8/2016 | Scown | ....................... | B64F 5/00 |
| 2017/0152045 A1 * | 6/2017 | Voss | ..................... | B64D 11/003 |
| 2017/0283058 A1 * | 10/2017 | Papke | .................. | B64D 11/003 |
| 2017/0328096 A1 * | 11/2017 | Allen | ......................... | E05C 9/04 |
| 2018/0029709 A1 * | 2/2018 | Savian | ..................... | B60Q 3/43 |
| 2018/0044022 A1 * | 2/2018 | Savian | .............. | B64D 11/0015 |
| 2018/0050801 A1 * | 2/2018 | Savian | ................. | B64D 11/003 |

FOREIGN PATENT DOCUMENTS

| | | |
|---|---|---|
| AT | 513939 A1 | 8/2014 |
| DE | 4335151 A1 | 4/1995 |
| DE | 19617657 A1 | 11/1997 |
| DE | 4130644 A1 | 3/1998 |
| DE | 102006045189 A1 | 4/2008 |
| DE | 102008049639 A1 | 4/2010 |
| DE | 102010034025 A1 | 2/2012 |
| DE | 102011110406 A1 | 2/2013 |
| EP | 1260434 A1 | 11/2002 |
| EP | 1436194 B1 | 8/2005 |
| GB | 2263727 A | 8/1993 |
| WO | 03033346 A1 | 4/2003 |

OTHER PUBLICATIONS

International Bureau of WIPO, English Translation of the International Preliminary Report on Patentability Issued in Application No. PCT/AT2015/050131, dated Dec. 1, 2016, WIPO, 9 pages.

* cited by examiner

OVERHEAD LUGGAGE COMPARTMENT FOR AIRPLANES, AND AIRPLANE

CROSS REFERENCE TO RELATED APPLICATIONS

The present application is a U.S. National Phase of International Patent Application Serial No. PCT/AT2015/050131, entitled "OVERHEAD LUGGAGE COMPARTMENT FOR AIRPLANES, AND AIRPLANE," filed on May 26, 2015. International Patent Application Serial No. PCT/AT2015/050131 claims priority to Austrian Patent Application No. A 50373/2014, filed on May 26, 2014. The entire contents of each of the above-cited applications are hereby incorporated by reference for all purposes.

TECHNICAL FIELD

The invention relates to an overhead luggage compartment for airplanes, comprising a stationary luggage compartment element which can be secured to a structural element and comprising a movable luggage compartment element which can be loaded with a piece of luggage, said stationary luggage compartment element and the movable luggage compartment element being connected together by a joint such that the movable luggage compartment element can be pivoted between an open position and a closed position, and comprising a device for holding the movable luggage compartment element in the open position.

BACKGROUND AND SUMMARY

Furthermore, the invention relates to an airplane comprising such an overhead luggage compartment.

Such overhead luggage compartments are known in the prior art and were described, for example, in the Austrian patent application A 50078/2013 which has not yet been published. Said luggage compartments were developed for larger passenger airplanes, which also have a larger ceiling height. For the purpose of loading and unloading, the compartment is pivoted downwards into the open position. Such pivoting mechanisms usually include at least one spring element supporting the movement of the compartment against the gravitational force and into its closed position, and make it easier for the passenger to close the loaded compartment.

In addition, the compartments comprise a device for holding the compartment in its open position, which according to the EP 1 436 194 may be formed by a spring-supported ball, which engages in a corresponding locking recess when the compartment is in the open position. Thus, the compartment can be expediently held in its open position for loading and unloading, and therefore its handling may be facilitated. In this connection, the holding device must be positioned accordingly, and the spring force pressing the ball into the locking recess must be at least large enough so that it will not be overcome by the force of the spring element.

However, the known luggage compartments have the disadvantage of that the spring force of the holding device must be overcome independently of the load state. Disadvantageously, initiating the closing operation requires a high operating force, if the pivotable luggage compartment is loaded with pieces of luggage.

Moreover, the prior art has already proposed different devices for determining the load state of the compartment, however, only with the aim of adjusting the support of the closing movement depending on the load state.

The DE 41 30 644 A1, for example, shows an overhead luggage rack, whose operation requires only a minor operating force largely independent of the load and position of the movable compartment. For this purpose, the gas spring provided for supporting the closing operation is arranged pivotally such that the pivot point on the upper lever and thus the torque acting on the upper lever and supporting the closing operation of the compartment are variable. The weight of the movable compartment of the overhead luggage compartment rack is detected by a weighing pin acting on a weighing lever connected to the spring element. Depending on the weight of the load of the compartment, the gas spring is pivoted more or less and thus compensates the weight force of the compartment.

The DE 43 35 151 A1 likewise shows an overhead luggage compartment comprising a lowerable compartment, in which a further spring element can be connected depending on the load of the compartment, to support the closing operation. In the event of no load or little load of the compartment a support lever connected to the additional spring element will be blocked such that the additional spring element does not exercise any additional force on the compartment. If a loading of the compartment exceeds a certain threshold value which is detected by a weight-related deflection of the movable compartment, the blocking of the support lever can be released by an active pressure from below onto a release plate on the movable compartment part and the additional spring element acts to support the closing operation. A Bowden cable is arranged between the release plate and the support lever for transmitting the pressure onto the release plate on the blocking hook. Therefore, connecting the support spring requires the active help of the passenger.

The AT 410 536 B relates to a suspension device for lowerable luggage compartments. The compartment is connected to a stationary structural component via the suspension device, wherein the compartment can be lowered from a closing position into an open position. In this embodiment, a device for detecting the weight of the compartment is arranged on the compartment such that an additional spring element can be added depending on the detected weight of the compartment. The additional spring element is fixed by means of a retaining means in the form of a movable hook, until the compartment is loaded with pieces of luggage. Thereby, the compartment sinks downwards against the elastic force of a measuring spring, the hook being released by a Bowden cable, by means of which hook a sleeve of the spring element is retained. Thereby, in addition to a helical screw, the additional spring element can support the movement of the compartment to the closed position even when the latter is fully loaded.

The AT 413 812 B likewise relates to a suspension device for lowerable luggage compartments. A shift gate is arranged on the sidewall of the lowerable compartment, which shift gate interacts with a shift lever of a spring element in the opened position of the luggage compartment, in order to effect switching of the spring element depending on the weight of the compartment. The shift gate is moved depending on the weight-related change of position of the compartment. In the event of an ordinarily loaded compartment, the latter is moved downwards against the force of a measuring spring. Thereby, the shift gate also carries out a corresponding movement such that the shift lever comes to rest on the shoulder of the shift gate which is located somewhat further below and thus causes a rotational movement of a disk connected to the shift lever. Thus, the spring element is released, which thus can exert its force during the closing operation. In the case of such ordinary loading of the compartment, only the larger spring element acts. In a fully loaded state of the compartment the shift lever comes to rest on the bottommost shoulder of the shift gate such that the disk effects a further rotation of movement. Thus, both a sleeve of a further spring element and the spring element are released such that both spring elements can exert their force.

Further luggage compartments having devices for the weight-related support of the closing operation are described in DE 196 17 657 A1, EP 1 260 434 A1 and EP 1 436 194 B1.

In addition, further overhead luggage compartments are disclosed in DE 10 2006 45 189 A1, DE 10 2010 034 025 A1, US 2008/112754 A1 and DE 10 2011 110 406 A1.

On the other hand, the object of the present invention is to provide an overhead luggage compartment of the above cited type, by means of which the load state of the movable luggage compartment element for initiating the closing operation in the open position can be taken into consideration in a constructively simple, space-saving manner.

Said object is achieved by an overhead luggage compartment. Preferred embodiments are given in the depending claims.

In accordance with the invention the device for holding the movable luggage compartment element in the open position comprises a force transmission element which is connected to the joint between the stationary luggage compartment element and the movable luggage compartment element, wherein in the open position of the movable luggage compartment element the joint can be moved depending on the load state of the movable luggage compartment element, wherein when the movable luggage compartment element is in the open position, the force transmission element is arranged in an active position in the unloaded state and in an inactive position in the loaded state by means of moving the joint, wherein in the active position of the force transmission element a holding torque is exerted which counteracts the pivot of the movable luggage compartment element from the open position in the direction of the closed position.

Accordingly, the device according to the invention for holding the movable luggage compartment element in the open position is designed such as to detect the load state, that is the presence of a piece of luggage in the movable luggage compartment element, in order to adjust the operating force for initiating the closing operation. In the unloaded state, it is necessary to apply a holding torque in order to release the force transmission element moved into the active position. Compared to this, the force transmission element is inactive in the loaded state, thus facilitating closing of the luggage compartment. For this purpose, the invention provides an especially simple, reliable solution, in which the weight-related movement of the joint in the open position is used for shifting the force transmission element between the active position and in the inactive position. In a preferred embodiment, the joint is provided on overlapping sections of sidewalls of the movable and stationary luggage compartment element. In the unloaded state, in the open position of the movable luggage compartment element, the force transmission element is present in an upper, active position such that the holding torque must be overcome for closing the luggage compartment. Thus, any unintentional initiating of the closing operation can be prevented reliably. By loading the movable luggage compartment element the joint is moved downwards such that the force transmission element connected thereto in the open position of the movable luggage compartment element is arranged in the lower, inactive position. The force transmission element is adapted such that in the inactive position a lower holding torque than in the active position, preferably no holding torque is exerted on the movable luggage compartment element. Advantageously, in the loaded state, only the weight of the luggage compartment containing the piece of luggage has to be overcome, if one wants to move the luggage compartment from the open position in the direction of the closed position. Thus, the operation of the luggage compartment can be designed to be particularly comfortable. Furthermore, it is of advantage that the arrangement of the force transmission element on the joint is possible by slightly adapting conventional luggage compartments. Accordingly, the device according to the invention for determining the load state can be realized with little constructive effort. In addition, it is advantageous that the construction according to the invention is especially space-saving. Therefore, it is favorable if the force transmission element is connected directly to the joint. Finally, it is favorable that only slight movements of the joint as a function of the load state are sufficient already to activate or deactivate the device for holding the movable luggage compartment element in the open position.

To make use of the weight of the piece of luggage in a constructively simple manner for transferring the force transmission element between the active and inactive positions, it is favorable if the force transmission element can be moved between the active position and the inactive position essentially in the vertical direction, depending on the load state. Accordingly, the weight of the piece of luggage leads to a lowering of the joint between the movable and the stationary luggage compartment elements, whereby lowering of the joint is converted into a vertical movement of the force transmission element between the active position and the inactive position. When the force transmission element is in the active position, a holding torque is produced which counteracts the pivot of the movable luggage compartment element in the direction of the closed position.

To reliably arrest the movable luggage compartment element in the open position, it is of advantage if the stationary luggage compartment element comprises a contact element, which in the active position engages with the force transmission element, wherein in the inactive position of the force transmission element the engagement between the force transmission element and the contact element is released. Accordingly, the force transmission element, which is coupled to the joint between the movable and the stationary luggage compartment elements, interacts with the contact element which is provided on the stationary luggage compartment element. In the active position, the force transmission element and the contact element are connected to each other in a frictional and/or positive engagement. Therefore, in the unloaded state of the luggage compartment, it is necessary for closing the luggage compartment to overcome the frictional and/or positive engagements between the force transmission element and the contact element by applying the holding torque. Compared to this, in the loaded state of the luggage compartment, the force transmission element is arranged in the inactive position in which a lower or no holding torque is generated.

To provide the holding torque for the unloaded state of the luggage compartment which counteracts the pivot of the luggage compartment from the open position into the closed position, preferably at least one spring element for biasing the force transmission element in the direction of the active position is provided. Therefore, if no piece of luggage is available, the holding device is active in the open position of the movable luggage compartment element. On the other hand, due to the arrangement of a piece of luggage, the joint is lowered together with the force transmission element such that the force transmission element is arranged in the inactive position. Therefore, upon closing the luggage compartment in the loaded state a lower or no holding torque of the holding device must be overcome.

To increase the ease of use it is advantageous to provide a lifting spring between the movable luggage compartment element and the stationary luggage compartment element, with which lifting spring the pivot of the movable luggage compartment element from the open position into the closed position is supported.

Accordingly, the lifting spring acts in the direction of the closed position of the luggage compartment. In addition, a dampening element may be provided, which dampens the movement of the movable luggage compartment element downwards such that the movable luggage compartment element does not fall downwards abruptly upon opening. Such lifting springs or dampening elements have been used already for luggage compartments with pivotable luggage compartment elements. However, what is advantageous is the use in connection with the force transmission element according to the invention, which in the open position of the movable luggage compartment element is arranged in an active or in an inactive position, depending on the load state. The pivot movement of the movable luggage compartment element can be supported by the lifting spring, as soon as the closing operation, depending on the load state, has been initiated by overcoming the holding torque. For example, a gas spring can be used as a lifting spring, which also assumes the function of a dampening element. Preferably, two lifting springs are provided per luggage compartment, which engage on opposite sidewalls of the movable and the stationary luggage compartment elements.

To use the pivot movement of the movable luggage compartment element to arrange the force transmission element in the active position, it is advantageous if the force transmission element is connected in a torque-proof manner to the joint between the movable luggage compartment element and the stationary luggage compartment element such that the force transmission element can be pivoted by pivoting the movable luggage compartment element. Advantageously, the suspension of the movable luggage compartment element can be designed in an especially simple manner if the force transmission element is connected directly to the joint. Accordingly, the force transmission element is pivoted together with the joint. In the unloaded state of the luggage compartment, the force transmission element is preferably arranged exactly in the active position when the movable luggage compartment element reaches the open position. In this embodiment, transferring the force transmission element into the active position is coupled to reaching the open position of the movable luggage compartment element.

According to a preferred embodiment, the force transmission element and the contact element comprise corresponding locking elements, wherein in the open position of the movable luggage compartment element the locking elements are arranged in a locked position or in a release position, depending on the load state. In the unloaded state, the corresponding locking elements are locked with each other when the movable luggage compartment element reaches the open position. By overcoming the holding torque the locking connection is released upon closing of the luggage compartment. On the other hand, the locking elements remain inactive in the loaded state of the luggage compartment. This embodiment has the advantage that the force transmission element can be arranged in the active position only when the movable luggage compartment element is in the open position. Accordingly, in this embodiment a holding torque which counteracts the pivot of the movable luggage compartment element is provided only in the open position, which holding torque must be applied by the user to initiate the closing operation. As soon as the force transmission element has been moved into the release position at the beginning of the closing operation, the further pivot of the movable luggage compartment element can be accomplished without overcoming a torque produced by the holding device.

To generate the holding torque which counteracts the initiation of the closing operation it is favorable if the locking element of the contact element is connected to a holding spring such that the locking element of the contact element can be moved against the force of the holding spring in the direction of the release position. The holding torque which counteracts the pivot thus results from the force effect of the holding spring and the lifting arm, which is formed between the locking element of the contact element and a grip element that can be gripped by a user.

As regards a space-saving, constructionally simple embodiment, it is advantageous if the locking element of the force transmission element is designed as a locking disk which comprises a locking projection to lock with the locking element of the contact element. The locking disk of the force transmission element is preferably connected to the joint between the movable and the stationary luggage compartment elements in a torque-proof manner. Accordingly, the locking disk can be turned by pivoting the movable luggage compartment element, wherein the locking projection of the locking disk is locked in the unloaded state with the corresponding locking element on the stationary luggage compartment element, as soon as the movable luggage compartment element reaches the open position. In the loaded state of the luggage compartment, the joint, together with the force transmission element, is arranged in a lowered inactive position such that the locking projection of the force transmission element does not come into contact with the locking element on the stationary luggage compartment element.

What is particularly reliable is an embodiment in which the locking element of the contact element is formed by a spring lock which can be moved between the locked position and the release position by means of the locking element of the force transmission element. The spring lock is preferably supported in movable manner in an essentially radial direction, related to the joint between the stationary and the movable luggage compartment elements. When the locking element of the force transmission element impinges upon the free end of the spring lock, the spring lock is moved into the release position against the spring force. To unlock the locking elements the user must overcome the holding torque.

According to an alternative preferred embodiment the locking element of the contact element is formed by a spring-loaded ball element, which when the movable luggage compartment element is in the open position, in the unloaded state is arranged within a corresponding locking recess of the locking element of the force transmission element and in the loaded state outside the locking recess of the locking element of the force transmission element. In this embodiment the force transmission element preferably comprises a pivotable locking element connected to the joint in a torque-proof manner. The spring-loaded ball element can be actuated by pivoting the force transmission element.

Upon reaching the open position of the movable luggage compartment element the spring-loaded ball element at least partially snaps in place in the locking recess of the locking element of the force transmission element, if the force transmission element is arranged in the upper, active position in the unloaded state of the luggage compartment. Upon closing of the luggage compartment the ball element can be pressed out of the locking recess of the pivotable locking element against the force of the spring. Releasing the ball element therefore requires a force which causes the holding torque in the open position of the movable luggage compartment element. Upon pivoting into the open position the ball element can slide on the surface of the force transmission element.

In this embodiment it is also favorable if the spring element for biasing the force transmission element in the direction of the active position comprises at least one further spring-loaded ball element, preferably two spring-loaded ball elements. The at least one further spring-loaded ball element for biasing the force transmission element on the one hand and the spring-loaded ball element for locking of the movable luggage compartment element in the open position on the other side are preferably arranged on opposite sides of the force transmission element. If the weight of the piece of luggage in the movable luggage compartment element exceeds a predetermined value, the force transmission element is lowered against the force of the at least one further spring-loaded ball element into the active position such that the locking elements in the open position of the movable luggage compartment element are arranged in the release position. In this case, the closing operation can be initiated without applying the holding torque.

According to a further preferred embodiment the force transmission element comprises a frictional surface, with which a frictional force depending on the load state of the movable luggage compartment element can be transferred onto a corresponding frictional surface of the contact element. In the active position of the force transmission element a higher frictional force is transferred to the contact element than in the inactive position of the force transmission element, since the frictional force decisively depends on the normal force between the frictional surfaces, which is influenced by the weight-related position of the force transmission element. In the loaded state, the frictional surfaces can be arranged at a distance to one another at least in the open position of the luggage compartment such that the friction between the frictional surfaces disappears completely. Depending on the design, a frictional force may exist between the fictional surfaces in the loaded state, which however is smaller than in the unloaded state.

To manage the weight-related adjustment of the holding torque in the open position with as little adjustments as possible on the suspension of the movable luggage compartment element, it is advantageous if the frictional surface is provided on the circumference of the force transmission element jointly pivotable with the movable luggage compartment element. In this embodiment, the contact element may have a corresponding frictional surface, on which the frictional surface of the force transmission element slides upon closing the luggage compartment.

To increase the friction between the frictional surfaces in the unloaded state of the luggage compartment, it is favorable if the frictional surface on the force transmission element and/or on the contact element comprises an anti-slip material.

According to a particularly preferred embodiment it is provided that the force transmission element is supported such that the joint between the stationary luggage compartment element and the moveable luggage compartment element is lifted in the loaded state during the closing operation. In this embodiment the force transmission element, which is preferably designed so as to comprise a locking element, is supported with respect to the stationary luggage compartment element such that the joint is lifted upon closing of the loaded luggage compartment. Accordingly, the joint in the open position is lowered by loading the piece of luggage, whereby the locking elements are arranged in the inactive position. Upon closing, the joint is lifted by the support of the force transmission element. Advantageously, it may be ensured in a reliable manner that the luggage compartment is arranged in the closed position in a gap-free manner.

For this purpose it is provided in a first preferred variant of embodiment that the force transmission element is designed as a cam element having a non-circular support surface. In the open position of the loaded luggage compartment the cam-shaped force transmission element is arranged in a lying position. Upon closing of the luggage compartment, the cam-shaped force transmission element is transferred into an upright position, whereby the joint between the movable and the stationary luggage compartment element is lifted accordingly by being supported on the stationary luggage compartment element. In particular, the force transmission element can have an oval support surface which is supported on a round support surface of the stationary luggage compartment element.

According to an alternative variant of the embodiment it is provided that the force transmission element is connected to a stop, by means of which the force transmission element can be lifted together with the joint upon reaching the closed position. The joint is lifted by this stop, when the loaded luggage compartment reaches the closed position. Thereby, it can be prevented that a gap is formed in the closed position despite loading.

BRIEF DESCRIPTION OF THE FIGURES

Below, the invention will be further illustrated on the basis of preferred exemplary embodiments, to which the invention shall not be limited. In detail, the following is shown in the drawing.

DETAILED DESCRIPTION

Figure 1:
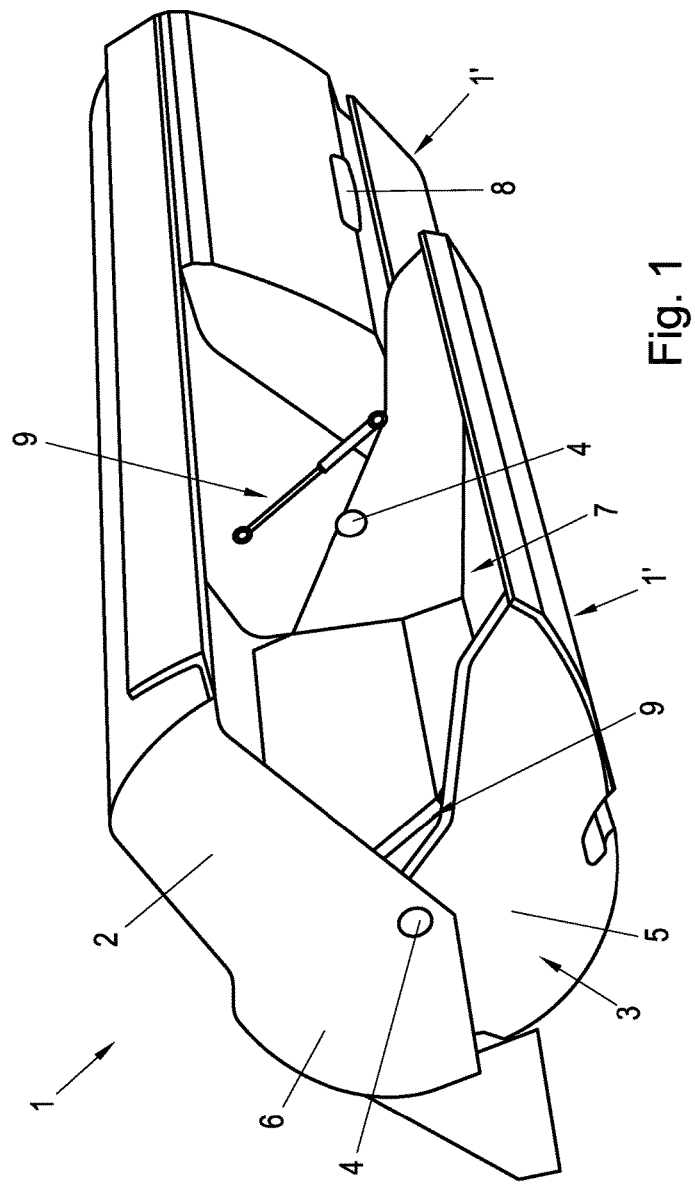
FIG. 1 shows a schematic view of an overhead luggage compartment for airplanes, wherein a movable luggage compartment element is pivotally supported on a stationary luggage compartment element by means of joints.

FIG. 1 shows an overhead luggage compartment 1 for airplanes, comprising in the shown embodiment two identically designed luggage compartment modules 1'. Of course, only one such luggage compartment module 1' or more than two such luggage compartment modules 1' may be provided. The luggage compartment modules 1' each comprise a stationary luggage compartment element 2, which can be connected to a structural element, in particular to an aircraft fuselage (not shown). Moreover, the luggage compartment 1 comprises a movable luggage compartment element 3 which may be designed as a trough, semi-chute or U-shaped luggage compartment to accommodate pieces of luggage. The movable luggage compartment element 3 is suspended on the stationary luggage compartment element 2 on both sides by means of joints 4 having joint axes 4'. The joints 4 are located on overlapping sections of sidewalls 5 of the movable luggage compartment element 3 and sidewalls 6 of the stationary luggage compartment element 2. The movable luggage compartment element 2 can be pivoted between an open position (cf. the left luggage compartment module 1' in FIG. 1), in which a load opening 7 is released, and a closed position (cf. the right luggage compartment module 1' in FIG. 1), in which the load opening 7 is closed. For this purpose, the movable luggage compartment element 3 comprises a grip element 8 on the visible side, with which the luggage compartment 1 can be opened or closed. Furthermore, FIG. 1 shows lifting springs 9 between the movable luggage compartment element 3 and the stationary luggage compartment element 2, with which the pivot of the movable luggage compartment element 3 from the open position into the closed position is supported. The spring element is preferably connected to a damping element (not shown).

Figure 2:
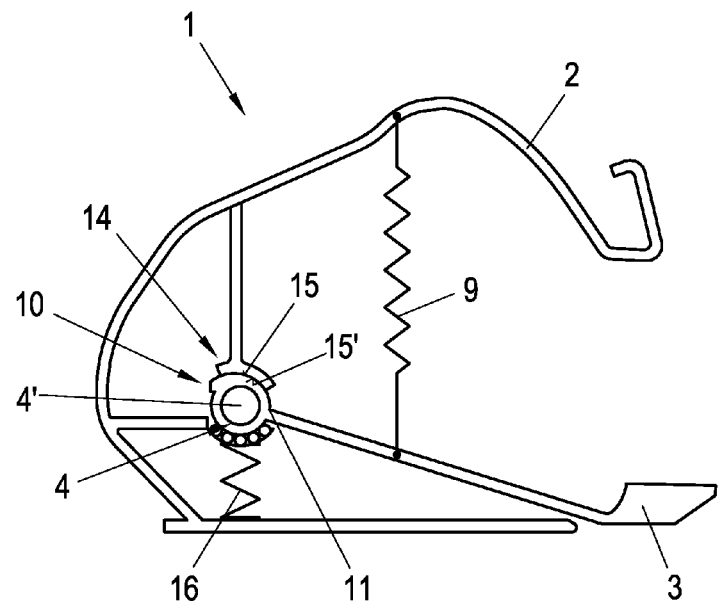
FIG. 2 shows an embodiment according to the invention of the overhead luggage compartment, in which the joints are coupled to the force transmission elements, which in the open position of the movable luggage compartment element exert a holding torque depending on the load state on the movable luggage compartment element by means of frictional surfaces sliding on one another, wherein the luggage compartment is shown in the unloaded state.
Figure 3:
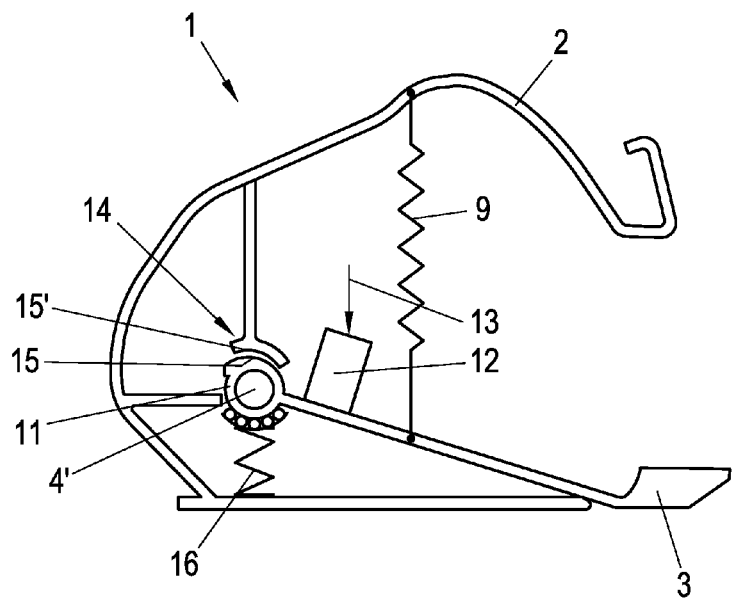
FIG. 3 shows an embodiment of the overhead luggage compartment in the loaded state in which the joints are coupled to the force transmission elements.

As can be seen from FIGS. 2, 3 the luggage compartment 1 additionally comprises a device 10 for holding the movable luggage compartment element 3 in the open position, which is designed to detect a load state of the movable luggage compartment element 3. In the shown embodiment, the device 10 comprises a force transmission element 11, which is connected to the joint 4 between the stationary luggage compartment element 2 and the movable luggage compartment element 3. Of course, both opposite joints 4 of the luggage compartment 1 may be designed identically. When the movable luggage compartment element is in the open position (cf. FIG. 2), the joint 4 can be moved depending on the load state of the movable luggage compartment element 3 in a vertical direction. FIG. 3 schematically shows a piece of luggage having a weight 12 generating a force in the direction of arrow 13. Due to the weight-dependent movement of the joint 4 the force transmission element 11 is arranged in an active position in the unloaded state (cf. FIG. 2) and in an inactive position in the loaded state (cf. FIG. 3). In the active position of the force transmission element 11, a holding torque is exerted which counteracts the pivot of the movable luggage compartment element 3 from the open position in the direction of the closed position such that the movable luggage compartment element 3 is held in the open position. For this purpose, the stationary luggage compartment element 2 comprises a contact element 14, which in the active position engages the force transmission element 11, whereas in the inactive position of the force transmission element 11 the engagement between the force transmission element 11 and the contact element 14 is released.

According to FIGS. 2, 3 the force transmission element 11 comprises a frictional surface 15, with which a frictional force depending on the load state of the movable luggage compartment element 3 can be transferred onto a corresponding frictional surface 15' of the contact element. In the shown embodiment, the frictional surface 15 is provided on the circumference of the force transmission element 11, which is connected to the joint 4 in a torque-proof manner. Accordingly, the force transmission element 11 is pivoted together with the movable luggage compartment element 3 upon closing of the luggage compartment 1. In the unloaded state of the luggage compartment 1 (cf. FIG. 2), a frictional torque is generated by the friction between the frictional surfaces 15, 15', which is overcome by the user upon closing of the luggage compartment 1. To adjust a suitable holding or frictional torque, the frictional surface 15 on the force transmission element 11 and/or the frictional surface 15' on the contact element 14 may comprise an anti-slip material.

As may be further seen from FIGS. 2, 3, at least one spring element 16 for biasing the force transmission element 11 in the direction of the active position is provided. By loading the movable luggage compartment element 3 with the piece of luggage, cf. weight 12 in FIG. 3, the force transmission element 11 can be moved against the force of the spring element 16 essentially in a vertical direction downwards and into the inactive position. Thus, the frictional surfaces 15, 15' are arranged at a distance such that the frictional or holding torque of the holding device 10 disappears in the open position of the movable luggage compartment element 3.

Figure 4A:
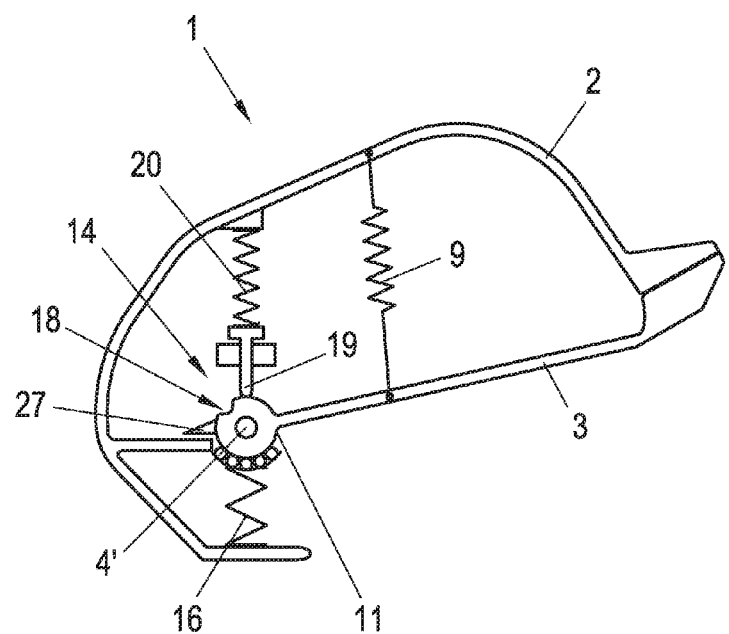
FIG. 4A shows a further embodiment according to the invention of the overhead luggage compartment whereby the joints between the movable and the stationary luggage compartment elements are connected to locking elements.
Figure 4B:
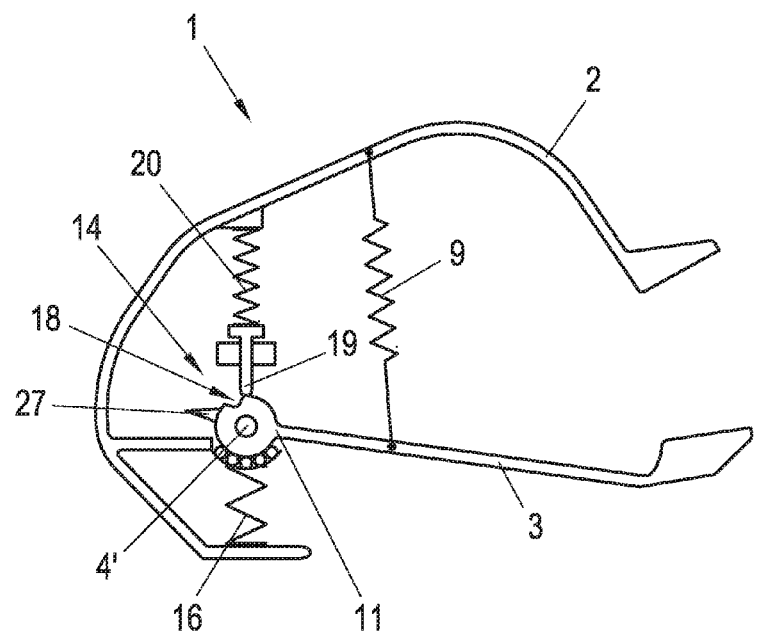
FIG. 4B shows the embodiment of the overhead luggage compartment whereby the joints between the movable and the stationary luggage compartment elements are connected to locking elements.
Figure 4C:
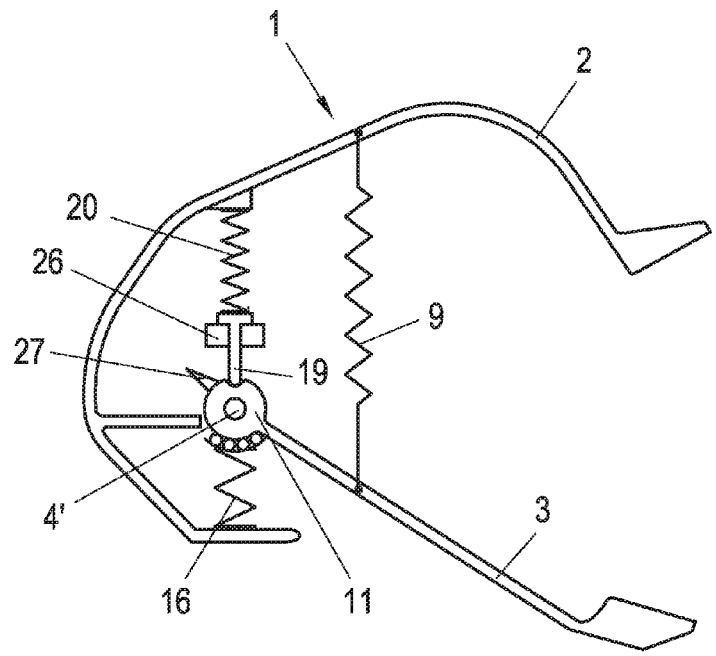
FIG. 4C shows the embodiment of the overhead luggage compartment in the unloaded state and locked in the open position, whereby the joints between the movable and the stationary luggage compartment elements are connected to locking elements.
Figure 4D:
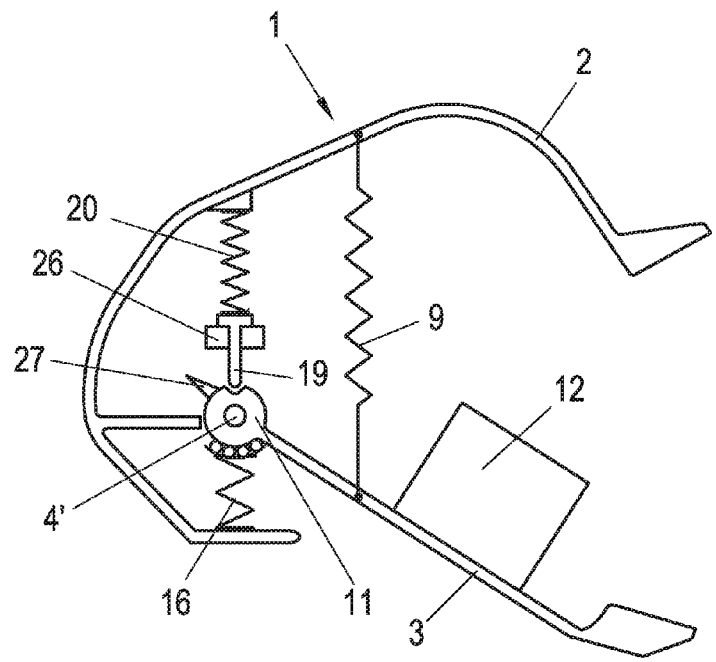
FIG. 4D shows the embodiment of the overhead luggage in the loaded state and in an unlocked state compartment, whereby the joints between the movable and the stationary luggage compartment elements are connected to locking elements.
Figure 4E:
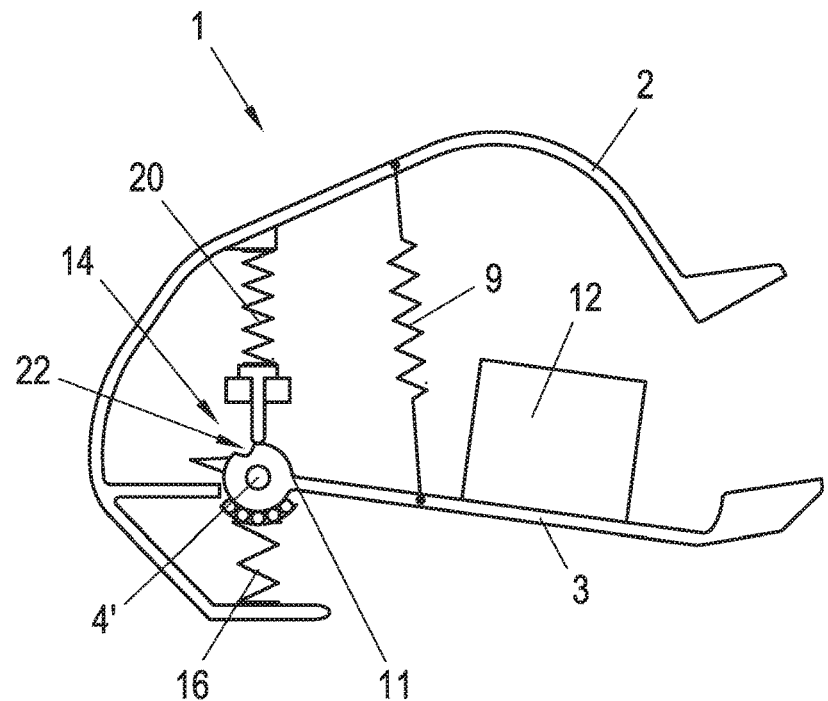
FIG. 4E shows the embodiment of the overhead luggage compartment, whereby the joints between the movable and the stationary luggage compartment elements are connected to locking elements.
Figure 4F:
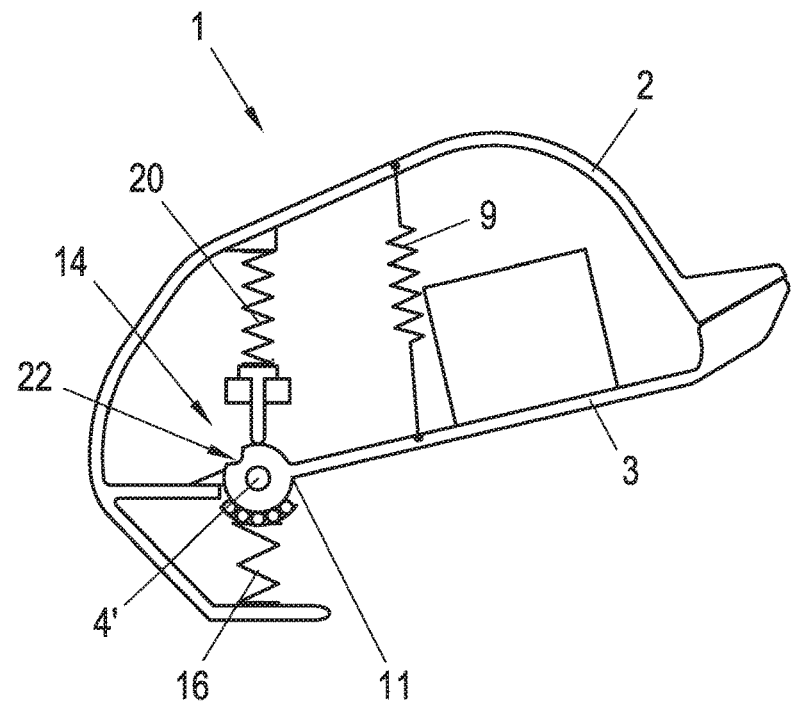
FIG. 4F shows the embodiment of the overhead luggage compartment pivoted in the direction of the closed position, whereby the joints between the movable and the stationary luggage compartment elements are connected to locking elements.

FIGS. 4A-F show alternative embodiments of the force transmission element 11, the suspension of the joint 4 on the luggage compartment 1 being shown only schematically for better overview. In FIG. 4A to FIG. 4C the opening operation of the luggage compartment is shown in the unloaded state, FIG. 4A showing the closed position, FIG. 4B showing an intermediate position and FIG. 4C showing an open position. FIGS. 4D to 4F illustrate the closing operation of the loaded luggage compartment, FIG. 4D showing the open position, FIG. 4E showing the intermediate position and FIG. 4F showing the closed position.

As can be seen from FIG. 4A, in this embodiment the force transmission element 11 is also connected to the joint 4 between the movable luggage compartment element 3 and the stationary luggage compartment element 2 in a torque-proof manner such that the force transmission element 11 can be pivoted by pivoting the movable luggage compartment element 3.

According to FIG. 4E and FIG. 4F the force transmission element 11 comprises a locking element 18 in the form of a locking recess 22, which interacts with a corresponding, bar-shaped locking element 19 of the contact element 14. Depending on the load state, in the open position of the movable luggage compartment element 3, the locking elements 18, 19 are arranged in a locked position (cf. FIG. 4C) or in a release position (cf. FIG. 4D). The locking element 19 of the contact element 14 is connected to a holding spring 20 such that the locking element 19 of the contact element 14 can be moved against the force of the holding spring 20 from the locked position (cf. FIG. 4C) in the direction of the release position (cf. FIG. 4B) in the unloaded state of the luggage compartment 1.

In addition, FIG. 4C and FIG. 4D schematically shows a stop 26, with which the movement of the locking element 19 is limited. In addition, a stop 27 is schematically shown, by which it is ensured that in the loaded state, upon reaching the closed position of the luggage compartment 1, the joint axis 4' is lifted to a position in which the luggage compartment 1 is closed in a gap-free manner.

Figure 5:
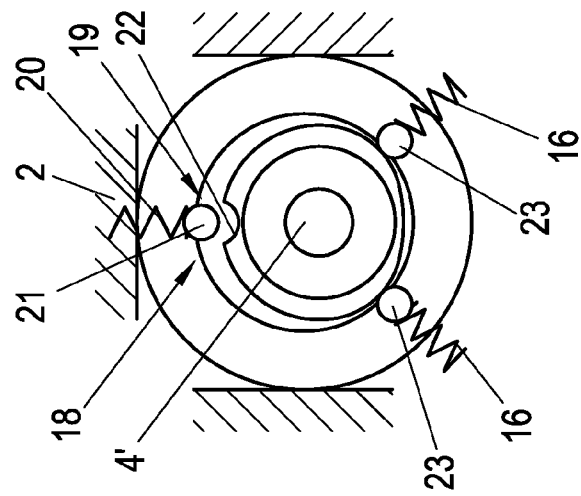
FIG. 5 shows a variation of the embodiment according to FIGS. 4A-4F comprising a ball element as a locking element in the locked state and in the unloaded open position.
Figure 6:
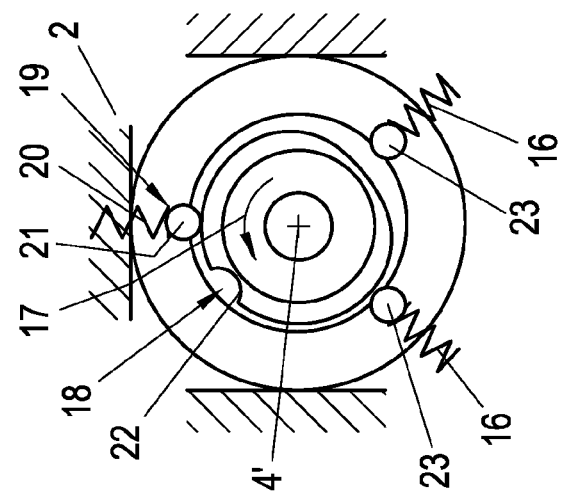
FIG. 6 shows a variation of the embodiment according to FIGS. 4A-4F during the closing of the luggage compartment comprising a ball element as a locking element.
Figure 7:
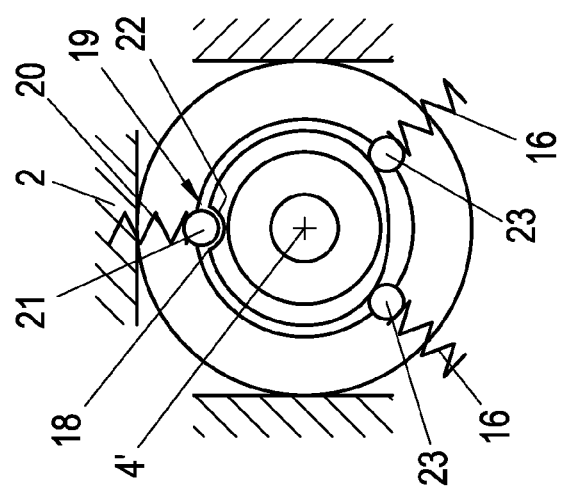
FIG. 7 shows a variation of the embodiment according to FIGS. 4A-4F in the non-locked state and in the loaded open position of the luggage compartment comprising a ball element as a locking element.

According to FIGS. 5 to 7 the locking element 19 of the contact element 14 is formed by a ball element 21 loaded by the spring element 20, with which ball element 21 a locking recess 22 of the force transmission element 11 interacts. Of course, the locking recess 22 may be provided alternatively on the locking element 19 and the ball element 21 on the force transmission element 11. In the open position of the movable luggage compartment element 3, the ball element 21 is partially arranged within the locking recess 22 of the locking element 18 of the force transmission element 11, if in the unloaded state of the luggage compartment 1 the force transmission element 11 is in the upper, active position. In the loaded state, the ball element 21 is arranged outside the locking recess 22 of the locking element 18 of the force transmission element 11. Upon closing the luggage compartment 1, the force transmission element 11 is pivoted in the direction of arrow 17 (cf. FIG. 6), the locking elements 18, 19 being released from their locking engagement.

As can be further seen from FIGS. 5 to 7, for biasing the force transmission element 11 in the direction of the active position, the spring element 16 comprises two further spring-loaded ball elements 23 in this embodiment, which roll on the corresponding support surface of the force transmission element 11. In the shown embodiment, the force transmission element 11 with the locking element 18 is designed as a cam element having a non-round, e.g. oval support surface. This causes the joint axis 4' to be lifted to the initial position prior to loading during the closing operation in the loaded state. Thus, the luggage compartment is arranged in the closed position in a gap-free manner.

Figure 8:
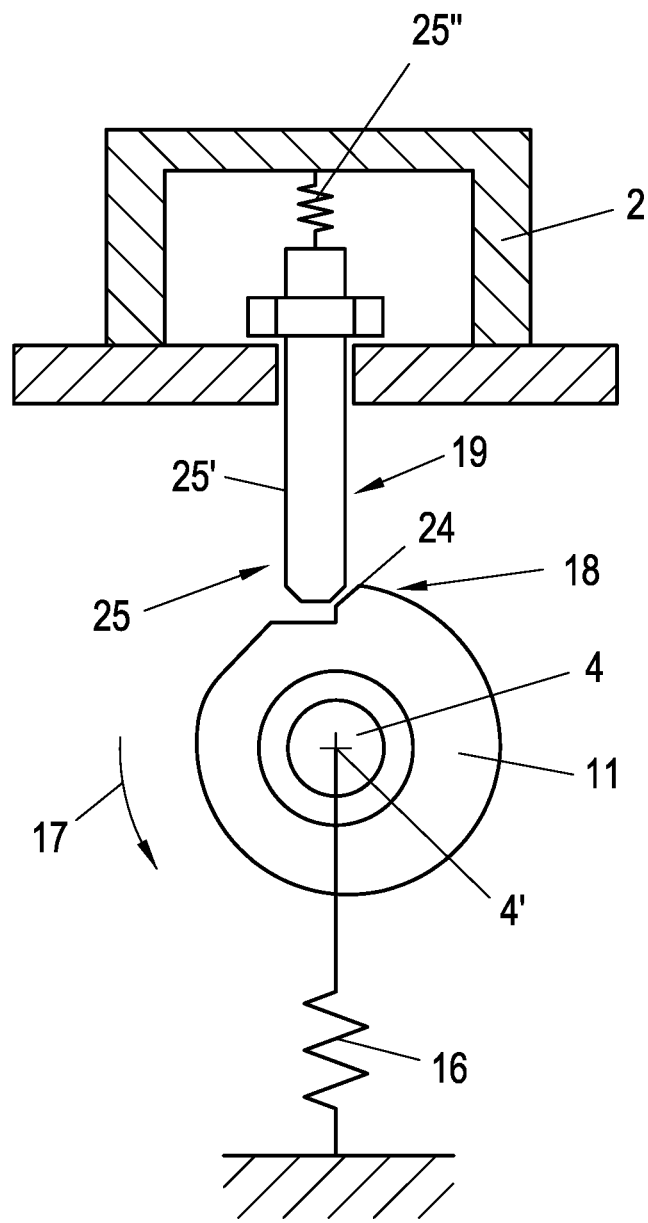
FIG. 8 shows a further embodiment according to the invention, with an alternative design of the locking elements which in the unloaded state of the movable luggage compartment element are locked and in the loaded state are released.

According to FIG. 8 the locking element 18 of the force transmission element 11 is designed as a locking disk connected to the joint 4 in a torque-proof manner which locking disk comprises a locking projection 24 for locking with the locking element 19 of the contact element 14. In the shown embodiment, the locking element 19 of the contact element 14 is formed by a spring bar 25 with a bar element 25' and a spring element 25''. The spring bar 25 can be moved by the locking element 18 of the force transmission element 11 between the locked position (cf. FIG. 7) and the release position (not shown) in that the movable luggage compartment element 3 is pivoted from the open position in the direction of the closed position.

The invention claimed is:

1. An overhead luggage compartment for airplanes, comprising a stationary luggage compartment element which can be secured to a structural element and comprising a movable luggage compartment element which can be loaded with a piece of luggage, the stationary luggage compartment element and the movable luggage compartment element being connected together by a joint having a joint axis such that the movable luggage compartment element can be pivoted between an open position and a closed position, and comprising a device for holding the movable luggage compartment element in the open position, wherein the device for holding the movable luggage compartment element in the open position comprises a force transmission element which is connected to the joint between the stationary luggage compartment element and the movable luggage compartment element, wherein in the open position of the movable luggage compartment element the joint being movable depending on the load state of the movable luggage compartment element by loading the movable luggage compartment element, wherein when the movable luggage compartment element is in the open position, the force transmission element is arranged in an active position in the unloaded state and in an inactive position in the loaded state by means of a movement of the joint, wherein the stationary luggage compartment element comprises a contact element which in the active position is engaged with the force transmission element, wherein in the inactive position of the force transmission element the engagement between the force transmission element and the contact element is released, the force transmission element being adapted such that in the inactive position of the force transmission element a holding torque is exerted that counteracts the pivot of the movable luggage compartment element from the open position in the direction of the closed position, which holding torque is lower than in the active position of the force transmission element.

2. The overhead luggage compartment according to claim 1, wherein the force transmission element can be moved essentially in a vertical direction between the active position and the inactive position, depending on the load state, related to a state of the overhead luggage compartment attached to a fuselage.

3. The overhead luggage compartment according to claim 1, wherein at least one spring element for biasing the force transmission element in a direction of the active position is provided.

4. The overhead luggage compartment according to claim 3, wherein a lifting spring is provided between the movable luggage compartment element and the stationary luggage compartment element, wherein by means of the lifting spring the pivot of the movable luggage compartment element from the open position into the closed position is supported.

5. The overhead luggage compartment according to claim 4, wherein the force transmission element is connected to the joint between the movable luggage compartment element and the stationary luggage compartment element such that the force transmission element can be pivoted by pivoting the movable luggage compartment element.

6. The overhead luggage compartment according to claim 5, wherein the force transmission element and a contact element comprise corresponding locking elements, and wherein the locking elements are arranged in a locked position or a release position in the open position of the movable luggage compartment element, depending on the load state.

7. The overhead luggage compartment according to claim 6, wherein the locking element of the contact element is connected to a holding spring such that the locking element of the contact element can be moved against the force of the holding spring in a direction of a release position.

8. The overhead luggage compartment according to claim 6, wherein the locking element of the force transmission element is designed as a locking disk for locking with the locking element of the contact element.

9. The overhead luggage compartment according to claim 6, wherein the locking element of the contact element is formed by a spring lock which can be moved by the locking element of the force transmission element between the locked position and release position.

10. The overhead luggage compartment according to claim 6, wherein the locking element of the contact element is formed by a spring-loaded ball element, which when the movable luggage compartment element is in the open position, in the unloaded state is arranged within a corresponding locking recess of the locking element of the force transmission element and in the loaded state is arranged outside the locking recess of the locking element of the force transmission element.

11. The overhead luggage compartment according to claim 10, wherein for biasing the force transmission element in the direction of the active position, the spring element comprises at least one further spring-loaded ball element, including two spring-loaded ball elements.

12. The overhead luggage compartment according to claim 3, wherein the force transmission element comprises a frictional surface, with which a frictional force depending on the load state of the movable luggage compartment element can be transferred onto a corresponding frictional surface of the contact element, including the frictional surface on the force transmission element and/or on the contact element comprising an anti-slip material.

13. The overhead luggage compartment according to claim 12, wherein the frictional surface is provided on the periphery of the force transmission element jointly pivotable with the movable luggage compartment element.

14. The overhead luggage compartment according to claim 12, wherein the force transmission element is supported such that the joint between the stationary luggage compartment element and the movable luggage compartment element is lifted in the loaded state during the closing operation, wherein the force transmission element is designed as a cam element having a non-circular support surface or the force transmission element is connected to a stop, by means of which the force transmission element can be lifted together with the joint, upon reaching the closed position.

15. An airplane comprising a structural element, secured to which is an overhead luggage compartment, wherein the overhead luggage compartment is designed according to claim 14.

* * * * *